(12) United States Patent
Ozdemir et al.

(10) Patent No.: US 9,531,150 B2
(45) Date of Patent: Dec. 27, 2016

(54) METHOD AND SYSTEM FOR PARITY-TIME SYMMETRIC OPTICS AND NONRECIPROCAL LIGHT TRANSMISSION

(71) Applicant: Washington University, Saint Louis, MO (US)

(72) Inventors: Sahin Kaya Ozdemir, Saint Louis, MO (US); Bo Peng, Saint Louis, MO (US); Lan Yang, Saint Louis, MO (US)

(73) Assignee: Washington University, St. Louis, MO (US)

( * ) Notice: Subject to any disclaimer, the term of this patent is extended or adjusted under 35 U.S.C. 154(b) by 0 days.

(21) Appl. No.: 14/685,335

(22) Filed: Apr. 13, 2015

(65) Prior Publication Data

US 2015/0295379 A1   Oct. 15, 2015

Related U.S. Application Data

(60) Provisional application No. 61/979,153, filed on Apr. 14, 2014.

(51) Int. Cl.
*H01S 3/05* (2006.01)
*H01S 3/06* (2006.01)
(Continued)

(52) U.S. Cl.
CPC .......... *H01S 3/10092* (2013.01); *G02F 1/365* (2013.01); *H01S 3/0627* (2013.01);
(Continued)

(58) Field of Classification Search
CPC ......... H01S 3/05; H01S 3/0627; H01S 3/1003
See application file for complete search history.

(56) References Cited

U.S. PATENT DOCUMENTS

| 2003/0048527 A1* | 3/2003 | Kimerling | ................. H01S 5/50 359/344 |
| 2004/0100675 A1* | 5/2004 | Matsko | ................. H01S 3/0627 359/245 |
| 2008/0074736 A1* | 3/2008 | Kuo | ................... H04B 10/2916 359/341.3 |

OTHER PUBLICATIONS

Lu et al. "Theoretical study of double microcavity resonators system with absorption or gain", Proceedings of SPIE, Integrated Optics and Photonic Integrated Circuits, p. 458, (Aug. 18, 2004).*

(Continued)

*Primary Examiner* — Eric Bolda
(74) *Attorney, Agent, or Firm* — Mark E. Stallion, Esq.; Husch Blackwell LLP

(57) ABSTRACT

A method and system for optical systems based on parity-time symmetry and its breaking, and for nonreciprocal light transmission in a parity-time symmetric micro-resonator system are provided. The system includes an optical assembly that includes a first dissipative optical system and a second optical system coupled in energy transfer communication with the first optical system. The second optical system is configured to receive a continuous flow of energy from an external source and to transfer energy to the first optical system through the couple wherein the energy transferred to the first optical system from the second optical system is approximately equal to the energy dissipated in the first optical system, where the energy transferred to the first optical system from the second optical system is selectable using at least one of an amount of couple between the first optical system and the second optical system and a gain of the second optical system.

21 Claims, 14 Drawing Sheets

(51) Int. Cl.
*H01S 3/17* (2006.01)
*H01S 3/10* (2006.01)
*G02F 1/365* (2006.01)
*H01S 3/082* (2006.01)
*H01S 3/094* (2006.01)
*H01S 3/16* (2006.01)

(52) U.S. Cl.
CPC ........ *G02F 2203/15* (2013.01); *H01S 3/0604* (2013.01); *H01S 3/082* (2013.01); *H01S 3/094038* (2013.01); *H01S 3/1608* (2013.01); *H01S 3/176* (2013.01)

(56) References Cited

OTHER PUBLICATIONS

Yin, et al., Unidirectional Light Propagation at Exceptional Points; Natural Materials; vol. 12, Mar. 2013, pp. 175-177.

* cited by examiner

METHOD AND SYSTEM FOR PARITY-TIME SYMMETRIC OPTICS AND NONRECIPROCAL LIGHT TRANSMISSION

CROSS REFERENCE TO RELATED APPLICATION

This application claims priority to and the benefit of U.S. Provisional Patent Application Ser. No. 61/979,153 entitled, METHOD AND SYSTEM FOR PARITY-TIME SYMMETRIC OPTICS AND NONRECIPROCAL LIGHT TRANSMISSION, filed Apr. 14, 2014, which is incorporated by reference herein in its entirety.

Statement Regarding Federally Sponsored Research and Development: The U.S. Government has certain rights in this application as provided for by the terms of Army Research Office grant No. W911NF-12-1-0026.

BACKGROUND

This description relates to optical logical components, and, more particularly, to systems and methods of forming components using parity-time symmetry and it's breaking, exhibiting non-linearity-based nonreciprocal light transmission using parity-time symmetry.

A challenge in the field of photonics is developing new materials and devices with unconventional and advanced functionalities to control the flow of light on-chip. Recently, optical systems combining balanced loss and gain have been proposed to originate synthetic materials with properties that cannot be attained in materials having only loss or only gain. Such systems provide a platform to implement classical analogues of quantum systems described by non-Hermitian parity-time (PT) symmetric Hamiltonians and are expected to play a significant role in optics. PT synthetic materials utilize modulation of the coupling strength between individual molecular or macroscopic sub-components and sub-systems of a larger system, its refractive index, and gain and/or loss. This leads to phenomena such as asymmetric power oscillations between two waveguides (sub-systems of larger sub-systems) and unidirectional reflectionless light propagation. Parity-time symmetry can be obtained when using a pair of coupled systems (e.g., coupled waveguides and/or coupled resonators) with one dissipating light-waves while the other is amplifying an equal amount. The optical power in the gain system (i.e., active system, such as an active waveguide) can increase while optical power decays in the other. The propagation of light is non-reciprocal in that the power oscillation between the two coupled sub-systems is no longer symmetric. However, the transmission remains reciprocal. Loss-induced transparency, power oscillations violating left-right symmetry, PT-synthetic photonic lattices, and unidirectional invisibility have been demonstrated, but other phenomena such as nonreciprocal light transmission, prior the technology as disclosed herein; and coexisting coherent-perfect-absorption (CPA) and lasing are yet to be realized. These could benefit significantly from resonance structures exhibiting PT-symmetry. However, to date, experiments in PT-symmetric optics have been limited to waveguides in which resonances play no role.

BRIEF DESCRIPTION

In one aspect, an optical assembly includes a first dissipative optical system and a second optical system coupled in energy transfer communication with the first optical system. The second optical system is configured to receive a flow of energy, continuous or non-continuous/pulse, from an external source and to transfer energy to the first optical system through the coupling wherein the energy received by the second optical system is approximately equal to the energy dissipated in the first optical system, where the energy transferred to the first optical system from the second optical system is selectable using at least one of an amount of couple between the first optical system and the second optical system and a gain of the second optical system. An optical system can include, but is not limited to, any system that generates, emits, transmits, modulates, signal processes, switches, amplifies, detects or senses light, which can encompass systems having semi-conductor light emitters, lasers, optical waveguides, optical fibers, and micro-resonators. However, the technology as disclosed can benefit various resonance structures, beyond micro-resonators, including various resonance structures, such as Fabry-Perot cavities, plasmonic cavities, and resonators, and nano-micro-cavities and resonators, exhibiting parity-time symmetry.

As used herein, gain represents energy received by the second system from an external source and approximately equals to the loss (dissipation) of the first system. The first and second systems are configured such that they can exchange energy through the coupling. The coupling is the transfer or the means of transfer of energy from one element or medium to another. In the case of electronics, the coupling can be between circuit elements (for example via capacitive or inductive coupling); and in the case of optics, the coupling can be between optical devices or elements. A rate of energy exchange depends on the strength of coupling between the first and second systems. There can be coupling losses between a first system or element and a second system or element. In the case of optics, loss can be due a change in the index of refraction between first and second systems and a portion of the energy can be reflected back into the source component. Another reason for loss can be due to geometrical inconsistencies. The amount of energy transferred from the second system to the first system is controlled by the coupling strength and the amount of gain in the second system.

In another aspect, a method of nonreciprocal light transmission in a micro resonator system wherein the method includes coupling a first micro resonator optical system in energy communication to a second micro resonator optical system, operating the second micro resonator optical system in a dissipative mode wherein the second micro resonator optical system loses energy during the operation, adding gain to the first micro resonator optical system, transferring energy from the first micro resonator optical system to the second micro resonator optical system through the couple, and operating the first micro resonator optical system and second micro resonator optical system in a broken parity-time symmetry regime based on at least one of the amount of couple and the amount of gain added such that the micro resonator system exhibits nonreciprocal light transmission.

In yet another aspect, an optical logic component includes more than two resonant optical systems, at least some of the more than two resonant optical systems coupled together in energy transfer communication, a first portion of the more than two optical systems being dissipative systems, a second portion of the more than two optical systems are at least one of optically and electrically pumped to add a predetermined gain to associated ones of the first portion of the more than two resonant optical systems, said second portion configured to transfer energy to said first portion through the couple wherein the energy transferred to said first portion from said second portion is selectable to control a mode of operation of said optical logical component, where the energy transferred to said first portion from said second portion is selectable using at least one of an amount of couple between said first portion and said second portion and a gain of said second portion.

BRIEF DESCRIPTION OF THE DRAWINGS

FIGS. 1-9 show example embodiments of the method and apparatus described herein.

FIG. 1 is a schematic block diagram of an optical system in accordance with an exemplary embodiment of the present disclosure.

FIG. 2 is a plan view of the system shown in FIG. 1 illustrating the first resonator formed on a first chip and the second resonator shown in FIG. 1 formed on a second chip.

FIG. 3 is a side view of the first resonator shown in FIG. 1 and the second resonator shown in FIG. 1.

FIG. 4 is a graph of transmission spectra showing resonance lines of the first resonator shown in FIG. 1 and the second resonator shown in FIG. 1.

FIG. 5 is a graph of transmission spectra showing resonance lines of the first resonator shown in FIG. 1 and the second resonator shown in FIG. 1.

FIG. 6 is a graph showing a spectra of weak probe light.

Figure 1:
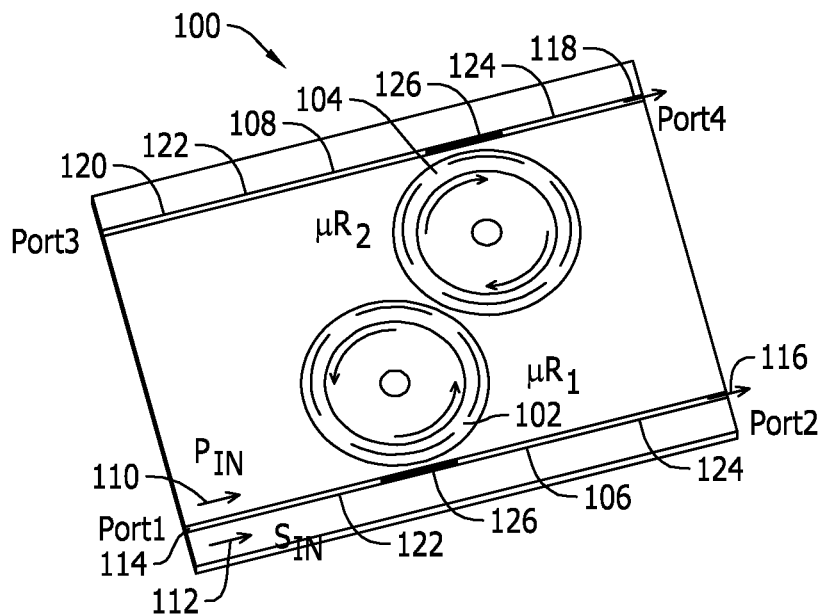

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

The following detailed description illustrates embodiments of the disclosure by way of example and not by way of limitation. It is contemplated that the disclosure has general application to non-reciprocal transmission in physical systems including, but not limited to light wave, sound wave, heat wave, and electronic systems that are operated in a non-linear regime and more particularly to such systems operated in a parity-time (PT) symmetric configuration and operated in a broken PT symmetric phase such that the nonlinearity is enhanced in industrial, commercial, and residential applications.

Parity-time-symmetric quantum Hamiltonian systems have attracted increasing attention. It is shown that the eigenvalues of non-Hermitian Hamiltonians $\hat{H}^\dagger \neq \hat{H}$ can be entirely real if they respect PT-symmetry, $PT\hat{H}=\hat{H}PT$. PT-symmetric systems are open physical systems having balanced absorption (loss) and amplification (gain). Remarkably, such systems can exhibit a phase transition (spontaneous PT-symmetry breaking) if the parameter controlling the degree of non-Hermiticity exceeds a critical value. Beyond this threshold the eigenvalues become complex even though $PT\hat{H}=\hat{H}PT$ still holds. PT symmetry has been studied experimentally and theoretically in various physical systems, with optics emerging as the most versatile platform to explore PT-symmetric applications.

In embodiments described herein, PT-symmetry breaking in a system of two directly-coupled on-chip whispering-gallery-mode resonators (WGMRs) is demonstrated. A transition to strong nonreciprocity in the PT symmetry-breaking phase is due to strong field-localization, which significantly enhances nonlinearity. In the linear regime, light transmission is still reciprocal regardless of whether the symmetry is broken or unbroken. Optical nonreciprocity has been a long sought-after goal in the study of PT-symmetry because of its substantial device implications for optical information processing. The embodiments described herein provide the first direct proof of nonreciprocity in PT-symmetric optics. A record-low power of 1 µW to observe nonlinearity-induced time-reversal-symmetry-breaking for nonreciprocal light transmission is achieved using a resonant structure. In one direction there is a complete absence of resonance peaks whereas in the other direction the transmission is resonantly enhanced. This feature is directly associated with the use of a resonant structure. As described herein, PT-symmetric microcavities are anticipated to be a starting point for unconventional optical systems utilizing resonance effects. For example, PT-symmetric microcavities are able to be used for building CPA-lasers and photonic analogues of topological insulators and for studying exceptional points in lasers. The embodiments described herein represent a significant advance towards a new generation of optical systems enabling on-chip manipulation and control of light propagation.

In a WGM resonator, light is confined by total internal reflection and circulates around the curved inner boundary of the resonator. WGM modes exhibit an evanescent tail that helps to couple light in and out of the resonator, and to probe the changes in or near the resonator for ultra-high performance sensing. Moreover, the evanescent tail makes it possible to couple directly two or more WGM resonators. The performance of a WGM resonator is determined by its quality factor Q, which represents the total loss (material, radiation, scattering and coupling losses) experienced by the light in the mode.

In one embodiment, the system can be composed of two directly coupled WGM microtoroidal resonators, each coupled to a different fiber-taper coupler. A first microtoroid includes a gain medium and may be referred to as an "active" resonator made from $Er^{3+}$-doped silica formed using sol-gel synthesis and the second microtoroid is a "passive" (e.g., not populated with a gain medium) resonator made from silica without dopants. To have a controllable direct coupling between them, the microtoroids can be fabricated at the edges of two separate chips. The chips can be placed on nanopositioning to control precisely the distance and hence the coupling between the microtoroids. Optical gain in the first microtoroid can be provided by optically pumping the $Er^{3+}$ ions, which emit in the 1550 nm band, with a pump light at a 1460 nm band. The Q-factors of the first microtoroid and the second microtoroid in the 1550 nm wavelength band are $3.3 \times 10^6$ and $3 \times 10^7$, respectively, and the first microtoroid has a Q-factor of $2.4 \times 10^6$ in the spectral band of the pump.

As the pump laser power is increased, the gain starts to compensate the losses of the first microtoroid in the 1550 nm band. This is reflected in the decreasing line width of the resonance line. When a weak probe light is coupled to first microtoroid together with the pump light, a strong resonance peak is observed, indicating that the weak probe signal has been amplified by the gain provided by $Er^{3+}$ ions. The resonance wavelength of the second microtoroid is thermally tuned through the thermo-optic effect of silica. By controlling the detuning in resonant wavelengths between first microtoroid and second microtoroid their coupling can be mediated in the 1550 nm band. In addition, the coupling between the resonators is modified by changing the distance between them. There is no coupling between the resonators in the 1460 nm band; thus, the pump light exists only in the first microtoroid. The ability to control the amplification and absorption ratio and the coupling strength in the exemplary embodiments described herein permits high versatility for investigating the novel physics of PT-symmetry. Previously, PT-symmetric photonic systems maintained a constant coupling strength, while the gain-to-loss ratio was varied. The embodiment described here allows to vary both the gain-to-loss ratio and the coupling strength.

The following description refers to the accompanying drawings, in which, in the absence of a contrary representation, the same numbers in different drawings represent similar elements.

FIG. 1 is a schematic block diagram of an optical system 100 in accordance with an example embodiment of the present disclosure. In the example embodiment, optical system 100 operates as an optical diode, in that light is transmitted in one direction through system 100 and not in the opposite direction through system 100. In other embodiments, optical system 100 can be configured to operate as analogs to other logic and/or control elements typically found in electronics-based circuits. Optical system 100 includes a first whispering-gallery-mode (WGM) resonator 102 directly coupled to a second WGM resonator 104, a first fiber-taper waveguide 106, and a second fiber-taper waveguide 108. Fiber-taper waveguides 106 and 108 each include a first normal portion 122, a second normal portion 124, and a tapered portion 126 between first normal portion 122 and second normal portion 124. Tapered portion 126 has a diameter smaller than the wavelength of light transmitted by a light source introducing light into waveguides 106 and 108. An evanescent field surrounds at least a part of tapered portion 126. With WGM resonator 102 positioned proximate to tapered portion 126 (e.g., within the evanescent field), at least some light carried by waveguide 106 can be transmitted to or coupled into WGM resonator 102. Similarly, light can be coupled out of or decoupled from WGM resonator 102 and coupled into tapered portion 126. Light can be coupled between WGM resonators 102 and 104. Additionally, light can be coupled into or out of WGM resonator 104 using waveguide 106.

In exemplary embodiments, WGM resonator 102 is configured to receive light from tapered portion 126 and to allow the light to propagate within WGM resonator 102. For example, a photon may travel around an ultra-high-Q WGM resonator 102 many times. Similarly, light can be coupled out of, or decoupled from, WGM resonator 102. Light may be emitted by WGM resonator 102 proximate to tapered portion 126 of waveguide 108 and transmitted by second normal portion 124 away from system 100.

A first resonator 102 can operate as an active resonator and a second resonator 104 can operate as a passive resonator. The first resonator 102 can be a microtoroid formed of $Er^{3+}$-doped silica. The second resonator 104 can be a microtoroid formed of undoped silica. Optical system 100 can further includes a pump laser 110 configured to emit in the 1460 nanometer (nm) band to excite the $Er^{3+}$ ions to provide gain in the 1550 nm band. Light from pump laser 110 stays in first resonator 102 and does not couple to second resonator 104. Light emitted from dopant couples from first resonator 102 to second resonator 104.

In various embodiments, where first resonator 102 is formed of other dopants than $Er^{3+}$ ions, pump laser 110 is configured to emit in a different wavelength band corresponding to the excitation wavelength of the other dopant. Optical system 100 further includes a signal source 112 configured to emit a probe light signal in the 1550 nm band.

Optical system 100 can be used to demonstrate the broken and unbroken parity-time (PT) phases of operation as a function of coupling strength between first resonator 102 and second resonator 104. For example, using only first fiber-taper waveguide 106 having a first port 114 and a second port 116, pump laser 110 and the weaker signal source 112, a probe laser can be input at first port 114 and the output transmission spectra can be monitored at second port 116 in the 1550 nm band. Without pump laser 110 operating, the coupled-resonator system 100 acts as a passive photonic molecule characterized by two super-modes whose spectral distance increases with increasing coupling strength by decreasing a distance between first resonator 102 and second resonator 104. It should be noted that when gain being approximately the same as loss is maintained, the technology can transit from unbroken to broken region and vice versa by varying the coupling strength. Further, when the coupling strength is fixed, the technology can transit between broken and unbroken regions by varying the gain-to-loss ratio. The technology provides for both, whether varying the coupling strength or varying the gain-to-loss ratio. The specific example illustrated herein varies the coupling strength. Also, please note that gain and loss don't have to be exactly the same, but can be proximate, one with respect to the other.

System 100 becomes PT-symmetric when first resonator 102 is optically pumped to provide gain and second resonator 104 has a balanced loss. At a fixed gain-loss ratio (i.e., pump power), an output of second port 116 can be monitored as a function of the coupling strength $\kappa$, observing that there was a threshold coupling strength ($\kappa_{PT}$) at which a PT-symmetry phase transition occurred. For $\kappa/\kappa_{PT}<1$, system 100 is in a broken PT-symmetry phase, as seen in both a zero mode-splitting (shown in FIG. 7A) and a nonzero line width difference (shown in FIG. 7B). This indicates that the real parts of the eigenfrequencies have coalesced and that their imaginary parts are different. As $\kappa/\kappa_{PT}$ approaches 1.0 from below, the line width difference decreases and frequencies bifurcate (mode-splitting).

In another embodiment, first resonator 102 can include a Q-factor of $2.0\times10^7$ and second resonator 104 can include a Q-factor of $3.0\times10^7$. A power of pump laser 110 can be adjusted such that a balanced loss-gain ratio between first resonator 102 and second resonator 104 is approximately achieved. The transition from the broken to unbroken phase occurs at different coupling strengths for modes with different Q, that is, different initial loss (shown in FIGS. 7D and 7D). The lower the Q-factor, the higher the $\kappa_{PT}$ for a PT phase transition. Typical transmission spectra in broken- and unbroken-PT-symmetric phases are shown, for example, in FIGS. 8A, 8B, and 8C.

If the coupling between the resonators 102 and 104 is weak, the energy in active first resonator 102 cannot flow fast enough into passive second resonator 104 to compensate for the absorption or loss of resonator 104. Therefore, system 100 cannot be in equilibrium and the eigenfrequencies are complex, implying exponential growth or decay. However, if the coupling strength exceeds a critical value, then system 100 can attain equilibrium because the energy in active first resonator 102 can flow rapidly enough into passive second resonator 104 to compensate the dissipation in resonator 104.

The frequency bifurcation (splitting) is not in orthogonal directions (shown in FIGS. 7A-D) as would be expected for ideal systems with exactly balanced gain and loss. Instead, the bifurcation is smooth and the degree of smoothness (how much the system deviates from the exactly balanced case) depends on the power of pump laser 110 and thus on the gain-to-loss ratio. Equations of motion for coupled oscillators, show that, for unbalanced gain and loss, the eigenfrequencies are never exactly real. Instead, there is a region of $\kappa$ where the difference in imaginary parts (line width difference) is large but the difference in real parts (mode splitting) is small (but nonzero). There is a second region where the line width difference is small but nonzero and the mode splitting is large. In practical implementations it is impossible to equalize the loss and gain exactly, so the mathematical prediction of a smooth bifurcation is physically realistic and is consistent with experimental observations (shown in FIGS. 7A-D).

PT-symmetric systems exhibit distinct behaviors including unidirectional or asymmetric transmission and invisibility, and enhanced or reduced reflections in the broken-PT-symmetric regime, where propagation is not invariant under the exchange of loss and gain. Nonreciprocal behavior in PT-symmetric system in the optical frequency range, which allows light to pass in only one direction is described using system 100. The strong nonreciprocal light transmission is associated with nonlinearity enhancement due to strong field localization induced by PT-symmetry-breaking. In the linear regime, light transmission is still reciprocal.

A linear static dielectric system, even in the presence of gain and loss, cannot have a nonreciprocal response. However, a system with nonlinearity can exhibit very strong non-reciprocal as shown using system 100. The transmission from first port 114 to an output port 118 is defined as forward transmission and transmission from output port 118 to first port 114 is defined as reverse transmission. The output spectra at first port 114 as the power of the input probe at output port 118 was varied when the system was in the broken- or unbroken-symmetry phases indicated clear nonlinear response in the symmetry-broken phase, in contrast to the linear response in the unbroken phase (shown in FIG. 8A). At low power levels, where the input-output relation was linear, the system was reciprocal in both the broken- and unbroken-symmetry regions (FIGS. 8B and 8C). This response shows a direct experimental clarification of the issue of reciprocity in PT symmetric systems; that is, PT symmetry or PT-symmetry breaking alone is not sufficient for nonreciprocal light transmission.

Figure 8A:
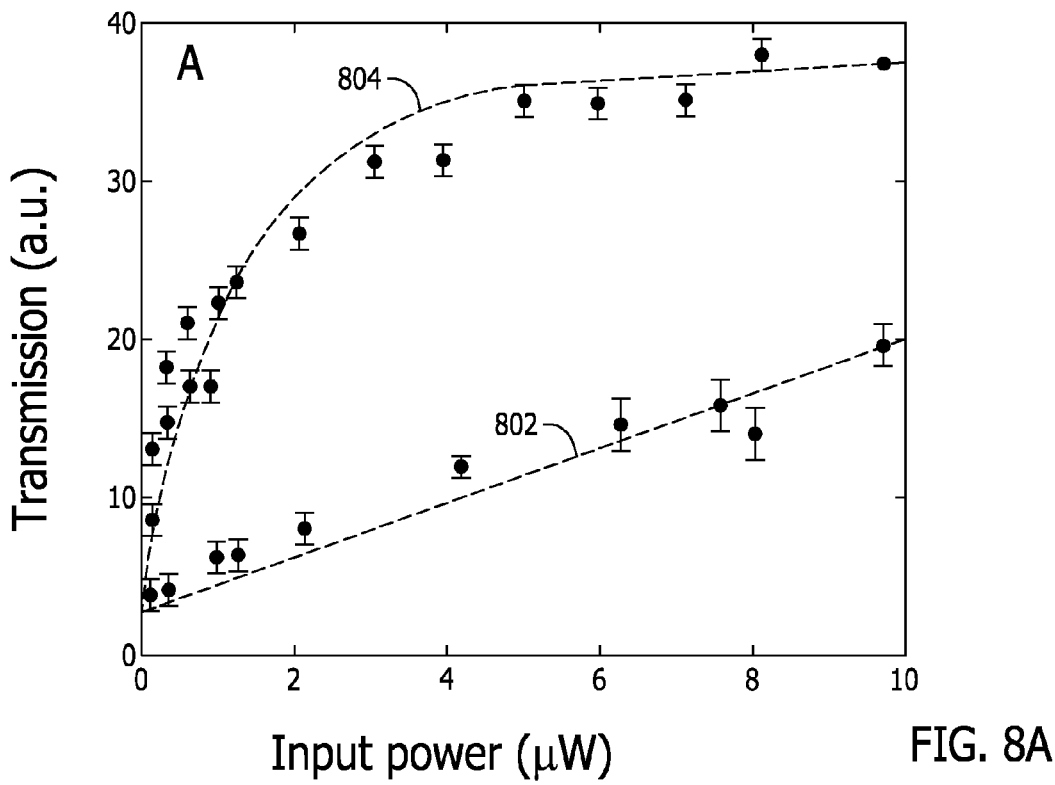
FIGS. 8A-C are graphs illustrating an input-output relation in the PT-symmetric WGM resonators shown in FIG. 1 showing a strong non-linear response in the broken-PT phase and a linear response in the unbroken-PT phase, and reciprocity in the linear regime of the broken-PT phase.
Figure 8B:
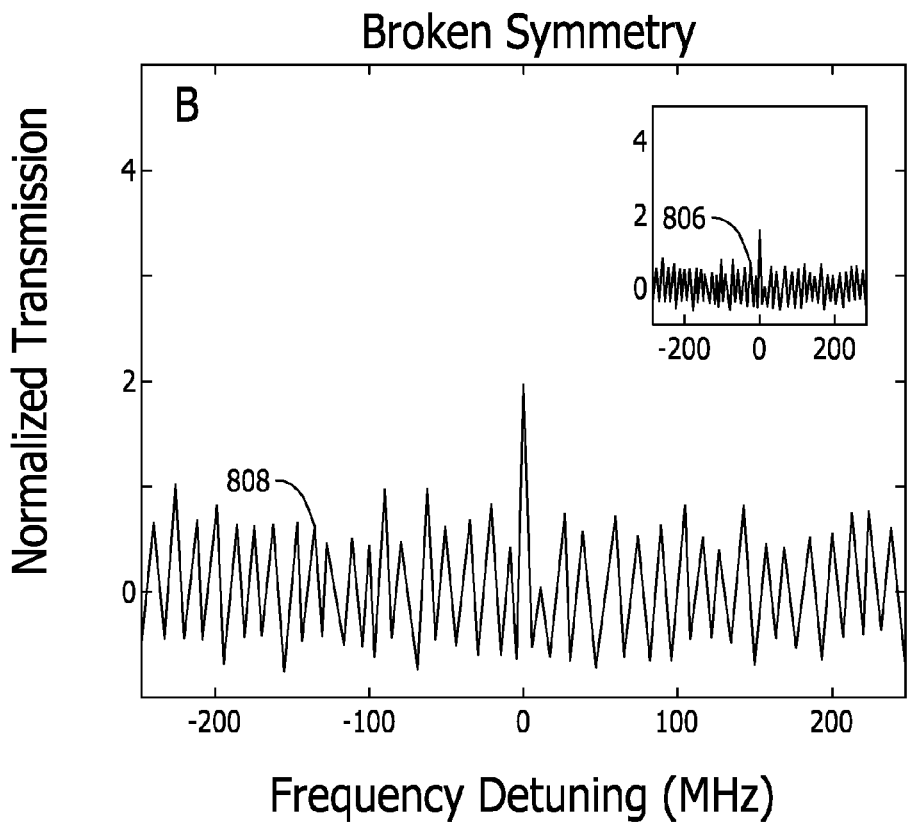
Figure 8C:
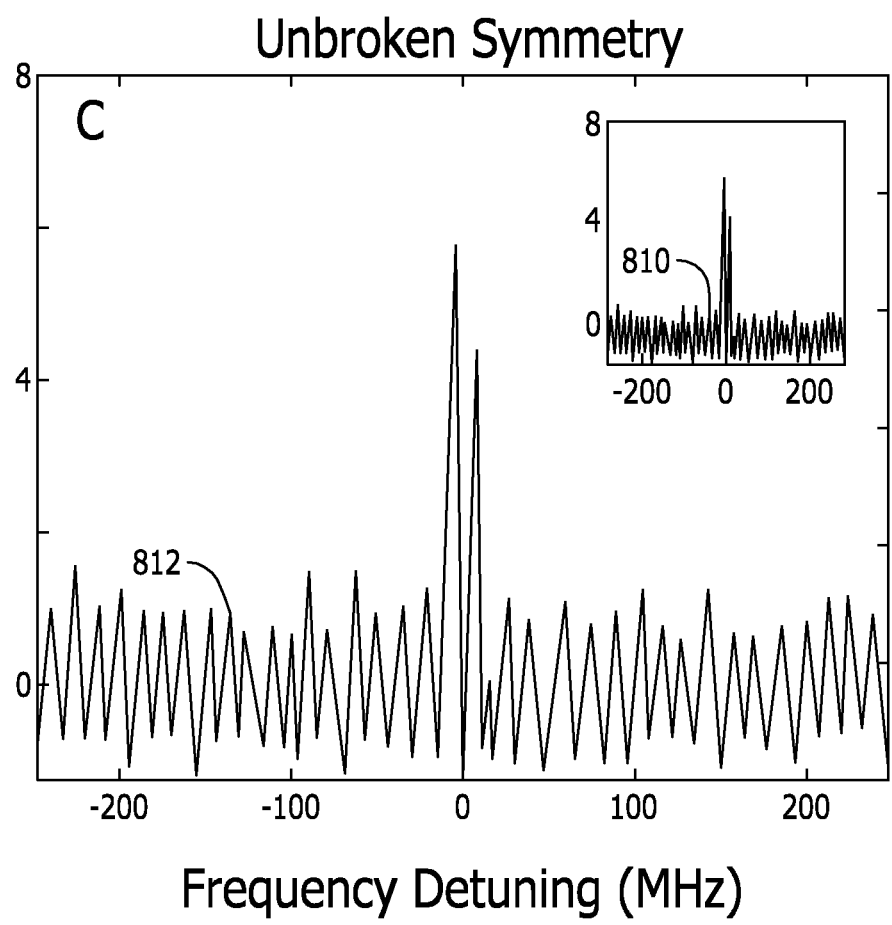

As demonstrated, as the input power is increased, system 100 remained in the linear regime for the unbroken-symmetry phase, whereas the input-output relation becomes nonlinear in the broken phase (shown in FIG. 8A). Such results indicate nonlinearity enhancement (i.e., the threshold for nonlinearity is lower) in the broken-symmetry phase, due to the stronger field localization into first resonator 102 with gain, as compared to the unbroken-symmetry phase.

Due to the stronger nonlinearity in the broken-symmetry case, the PT-symmetry transition is associated with a transition from reciprocal to nonreciprocal behavior. When pump laser 110 at first port 114 is OFF (first resonator 102 and second resonator 104 are passive) and a weak signal source 112 probe light is input at first port 114 or output port 118, resonance peaks are observed in the forward or backward transmissions (FIGS. 9B and 9F) with no resolvable mode splitting. When pump laser 110 is set ON and the gain and loss are balanced as much as possible so as to operate the system in the unbroken-PT-symmetric region, transmission spectra showing amplified signals with clearly resolved split peaks are observed at the outputs in this strong-coupling region (FIGS. 9C and 9G). However, when the coupling strength is decreased so that the system transitions into the broken-symmetry region, forward transmission reduces to approximately zero (FIG. 9D) but the backward transmission remains high (FIG. 9H). The transmission spectra show a single resonance peak (FIG. 9H), as expected. Thus, in the broken-symmetry region, the input at output port 118 is transmitted to first port 114 at resonance; however the input at first port 114 cannot be transmitted to output port 118, as opposed to what is observed for the unbroken-symmetry region. This indicates nonreciprocal light transport between first port 114 and output port 118.

The advantages of the present design, which brings together PT-symmetric concepts with nonlinearity-induced nonreciprocal light transmission, over the non-PT schemes utilizing nonlinearity are a significant reduction in the input power to observe nonreciprocity (approximately ~1 μW), higher contrast, small footprint and complete absence of the signal in one direction but resonantly enhanced transmission in the other direction. Similar nonreciprocity is observed between second port 116 and a third port 120. These results imply that PT-symmetric WGMRs can have strong nonreciprocal effects (all-optical diode action) in the nonlinear regime with very low power threshold due to significant enhancement of nonlinearity in the broken-symmetry phase.

Figure 2:
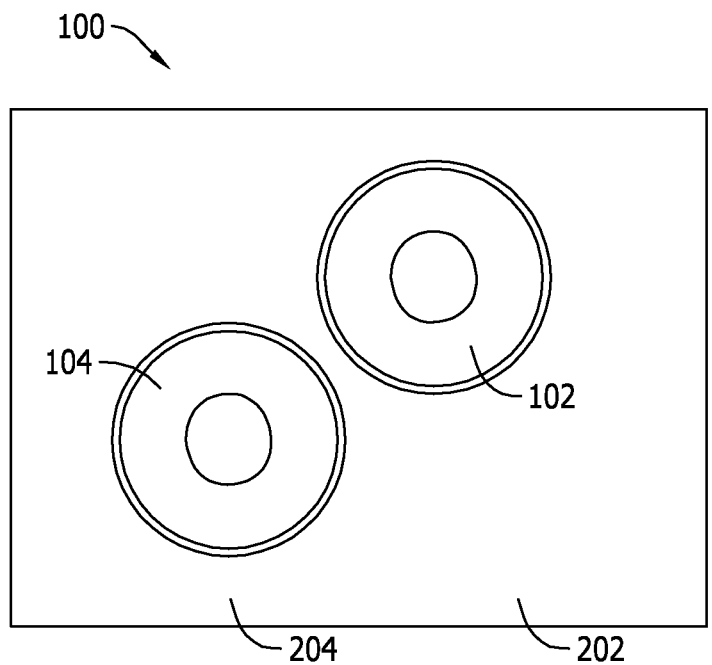

FIG. 2 is an image of a top of system 100 illustrating first resonator 102 formed on a first chip 202 and second resonator 104 formed on a second chip 204. Chips 202 and 204 are positioned on respective nanopositioning systems to control precisely a distance between them and hence the coupling between first resonator 102 and second resonator 104.

Figure 3:
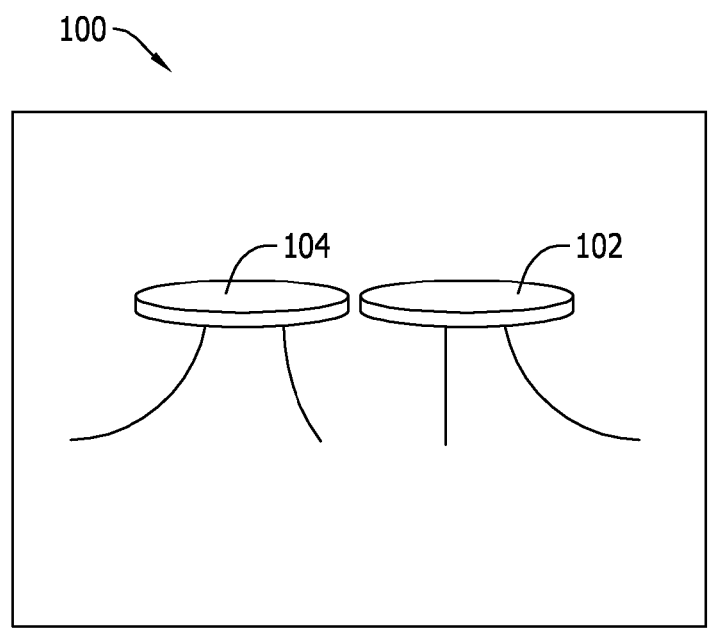

FIG. 3 is a side view of first resonator 102 and second resonator 104.

Figure 4:
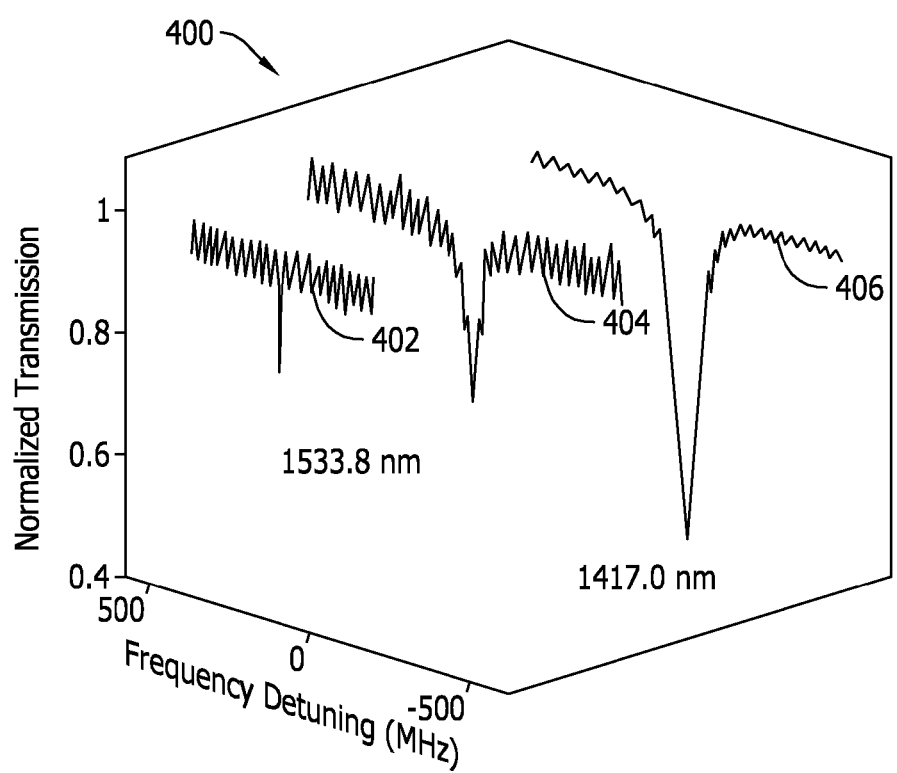

FIG. 4 is a graph 400 of transmission spectra showing resonance lines of first resonator 102 and second resonator 104. A first trace 402 shows a resonance line of second resonator 104 at approximately 1533.8 nm. A second trace 404 shows a resonance line of first resonator 102 at 1533.8 nm and a third trace 406 shows a resonance line of first resonator 102 at 1417.0 nm.

Figure 5:
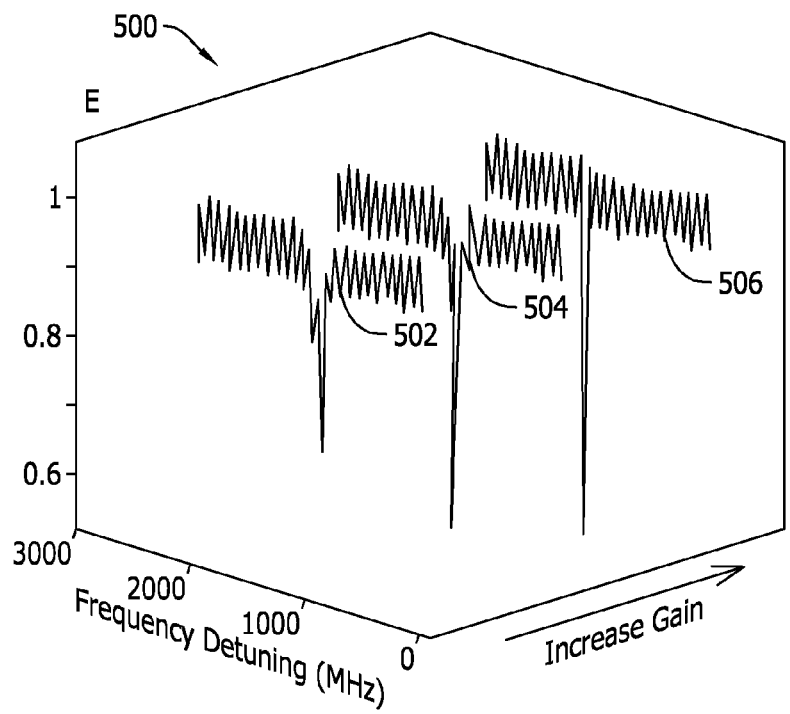

FIG. 5 is a graph 500 of transmission spectra showing resonance lines of first resonator 102. A first trace 502 shows a resonance line of second resonator 104 at approximately 1533.8 nm without gain. A second trace 504 shows the same resonance line at 1533.8 nm with small gain and a third trace 506 shows the same resonance line at 1533.8 nm with medium amount of gain. Gain provided by $Er^{3+}$-ions in first resonator 102 leads to narrower and deeper resonance lines as the power of pump laser 110 (gain) is increased, implying an increasing Q-factor.

Figure 6:
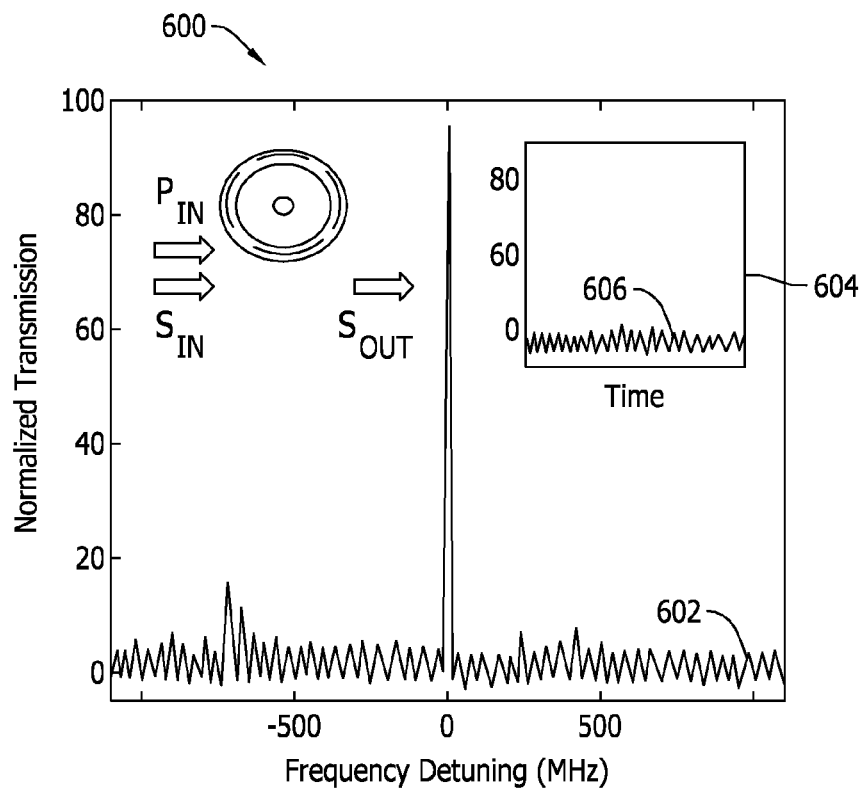

FIG. 6 is a graph 600 showing a spectra of weak probe light. A trace 602 shows that weak probe light from signal source 112 is amplified when it is coupled to first resonator 102 together with light from pump laser 110. An inset 604 shows a trace 606 of weak probe light that without the weak signal source 11 there is no resonance enhancement.

FIGS. 7A-D are graphs of real and imaginary parts of the eigenfrequencies calculated from the measured transmission spectra as a function of the coupling strength κ. The real part of the eigenfrequencies correspond to the resonance frequencies thus mode splitting is the difference between the real part of the eigenfrequencies. Imaginary parts of the eigenfrequencies gives the line width information. Negative imaginary part of eigenfrequency corresponds to a lossy system, a positive imaginary part corresponds to gain.

Figure 7A:
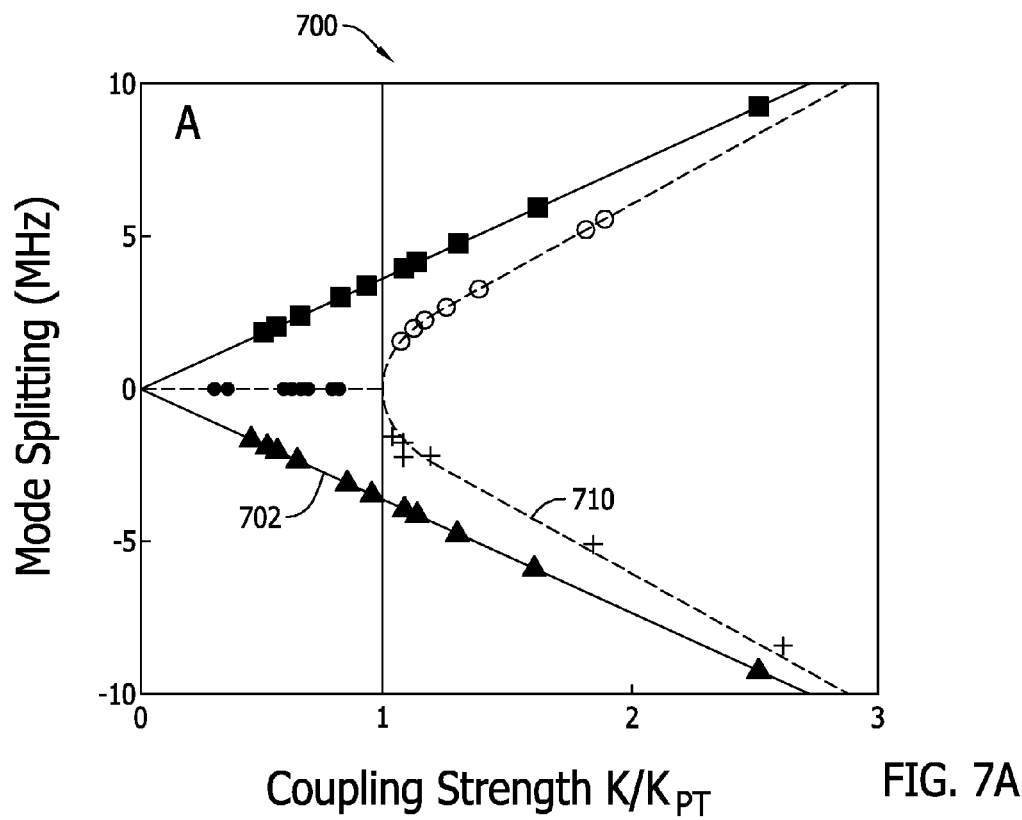
FIGS. 7A-D are graphs of real and imaginary parts of the eigenfrequencies calculated from the measured transmission spectra as a function of the coupling strength κ.
Figure 7B:
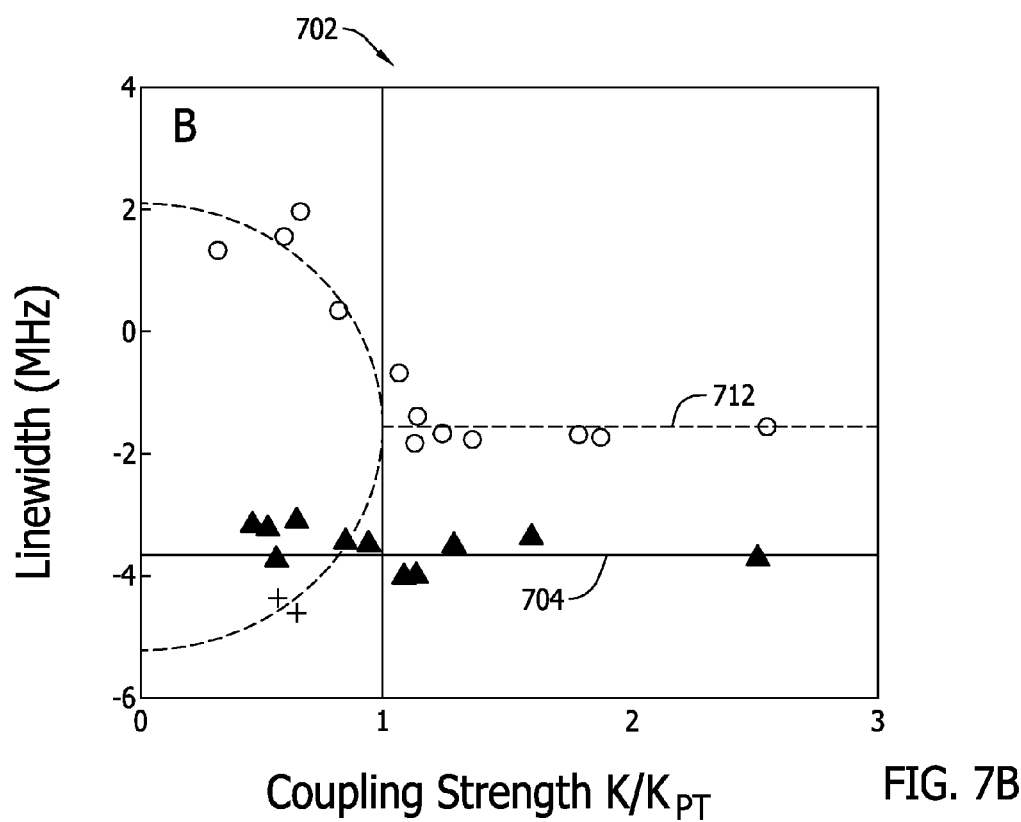
Figure 7C:
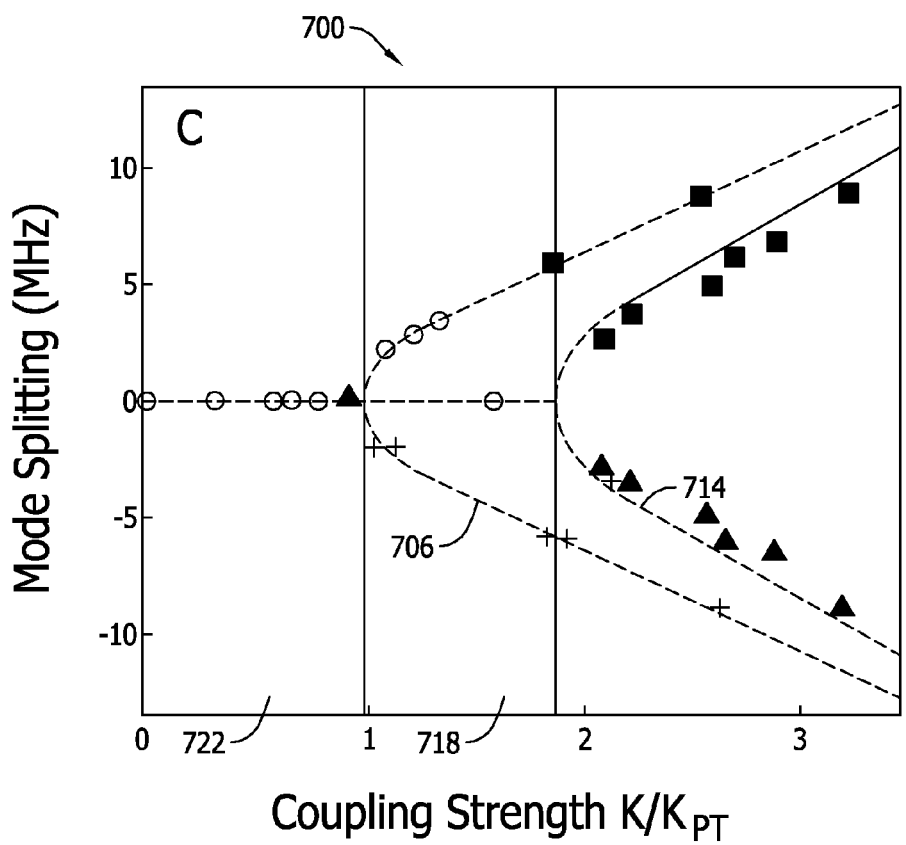
Figure 7D:
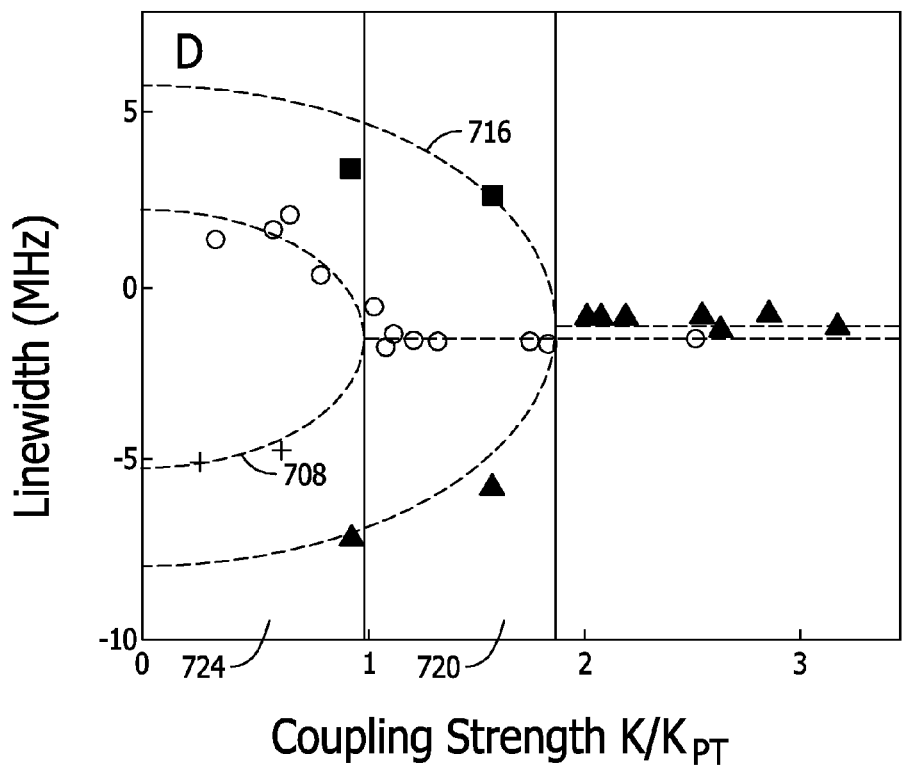

FIGS. 7A and 7C illustrate mode-splitting variation corresponding to the difference between the real parts and changes in the imaginary parts of the eigenfrequencies and FIGS. 7B and 7D illustrate and line width variation corresponding to the difference between the real parts and changes in the imaginary parts of the eigenfrequencies. Traces 702 and 704 illustrate when first and second resonators 102 and 104 are passive (no gain in first resonator 102) with Q factors $2.9 \times 10^7$ and $3.0 \times 10^7$, respectively, for first resonator 102 and second resonator 104. Traces 710, 712, 714, and 716 illustrate when first resonator 102 is active and second resonator 104 is passive. FIGS. 7C and 7D illustrate an effect of the initial Q-factor (loss) of second resonator 104 on the eigenfrequencies. Two resonance modes with Q-factors $2.0 \times 10^7$ 718 and 720, and $3.0 \times 10^7$ 722 and 724 are chosen for second resonator 104. Shaded regions correspond to the broken-PT-symmetric region when gain and loss are balanced.

FIGS. 8A-C are graphs illustrating an input-output relation in PT-symmetric WGM resonators and reciprocity in the linear regime. FIG. 8A includes a trace 802 illustrating a linear input-output relation in an unbroken-symmetry region. A trace 804 illustrates a nonlinear input-output relation in a broken-symmetry region. A signal applied at port 118 and transmitted to first port 114 is detected by a photodetector. Each data point represents an average of ten measurements, and an error bar represents a standard deviation.

FIG. 8B illustrates transmission spectra in the linear regime (input power of ~80 nW). A trace 806 illustrates reciprocal light transmission in a forward direction. A trace 808 illustrates reciprocal light transmission in a backward direction in the unbroken-symmetry region. The values represented in trace 806 were normalized with the signal detected at port 3 when the input was at port 4 and there was no coupling between the fiber tapers and the resonators. The values represented in trace 808 were normalized with the signal detected at port 2 when the input was at port 1 and there was no coupling between the fiber tapers and the resonators.

FIG. 8C illustrates transmission spectra in the linear regime (input power of ~80 nW). A trace 810 illustrates reciprocal light transmission in a forward direction. A trace 812 illustrates reciprocal light transmission in a backward direction in the unbroken-symmetry region. The values represented in trace 810 were normalized with the signal detected at port 3 when the input was at port 4 and there was no coupling between the fiber tapers and the resonators. The values represented in trace 812 were normalized with the signal detected at port 2 when the input was at port 1 and there was no coupling between the fiber tapers and the resonators.

The slight difference in the heights of the resonance peaks is attributed to the laser power fluctuations during frequency scanning and to the thermal fluctuations of the environment. These can be minimized, if not completely eliminated, by active stabilization and better control of the operational conditions.

Figure 9A:
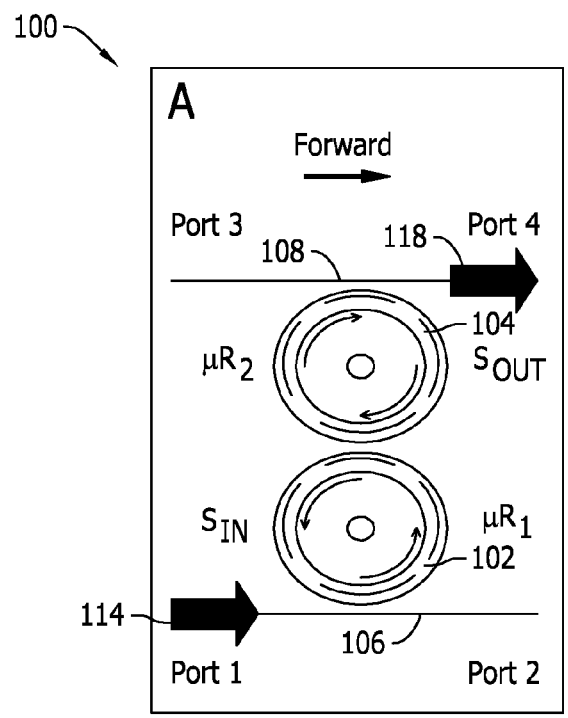
FIG. 9A is a schematic block diagram of optical system with transmission in the forward direction from the first port shown in FIG. 1 to the output port shown in FIG. 1.
Figure 9B:
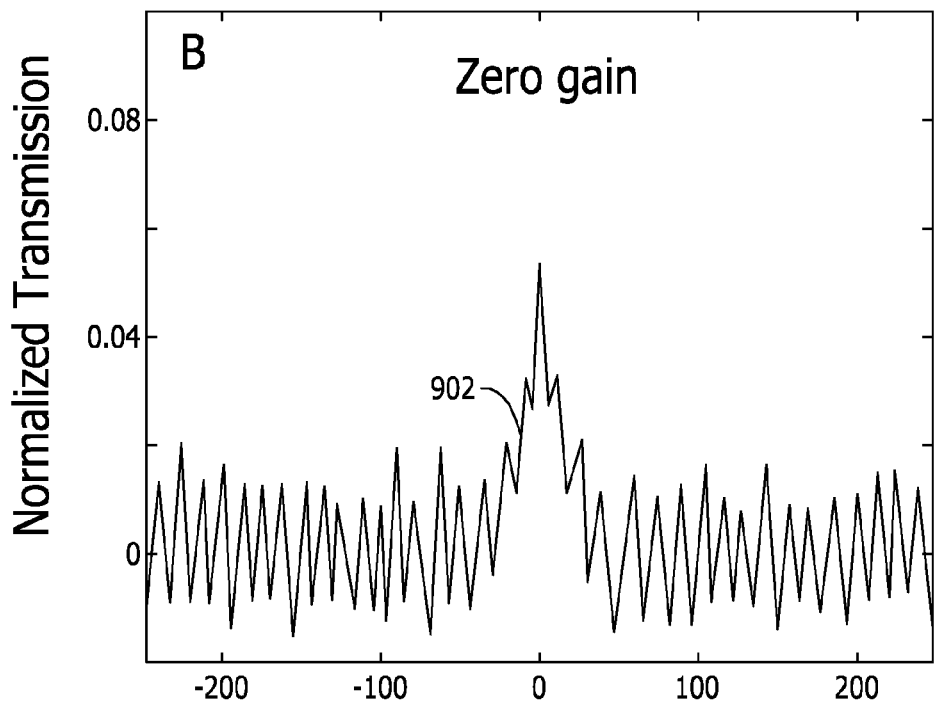
FIG. 9B illustrates that, in the forward direction as illustrated in FIG. 9A, light can pass through the optical system, when both resonators are passive (no gain).
Figure 9C:
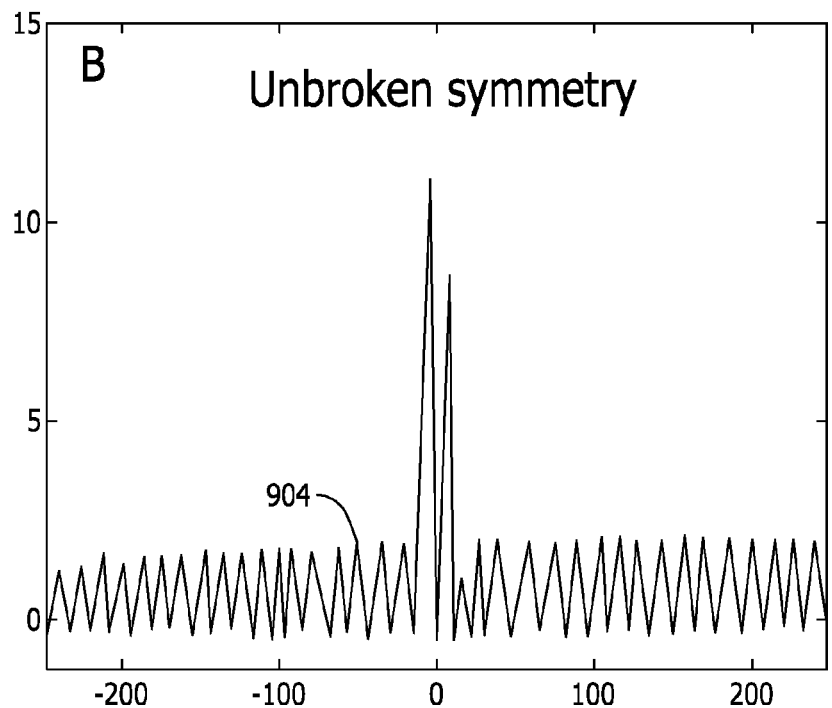
FIG. 9C illustrates that, in the forward direction as illustrated in FIG. 9A, light can pass through the system in the nonlinear regime, when the PT-symmetric resonators operate in the unbroken-symmetry region.
Figure 9D:
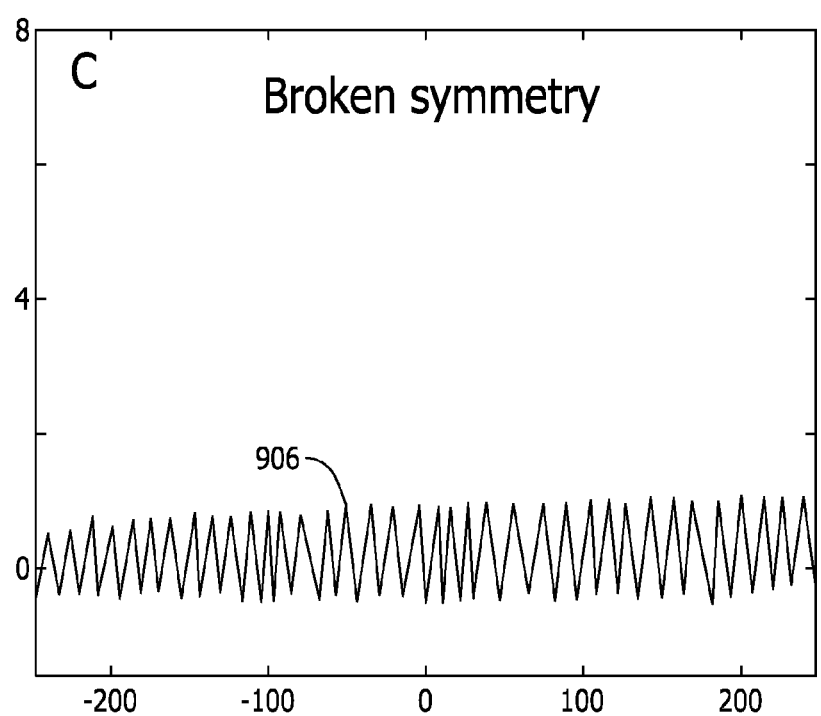
FIG. 9D illustrates that, in the forward direction as illustrated in FIG. 9A, light transmission is blocked in the nonlinear regime, when the PT-symmetric resonators operate in the broken-symmetry region.

FIG. 9A is a schematic block diagram of optical system 100 with transmission in the forward direction from port 114 to port 118. In the example embodiment, optical system 100 includes a first whispering-gallery-mode (WGM) resonator 102 directly coupled to a second WGM resonator 104, a first fiber-taper waveguide 106, and a second fiber-taper waveguide 108. FIGS. 9B-D illustrate observed unidirectional transmission for PT-symmetric WGM microresonators in the nonlinear regime. FIG. 9B includes a trace 902 illustrating a transmission when both resonators are passive (no gain), the transmission is bi-directional (reciprocal), and light is transmitted in the forward direction (reverse direction shown in FIG. 9F). FIG. 9C includes a trace 904 illustrating a transmission in the unbroken-symmetry region, where the coupling exceeds the critical value and gain and loss are balanced and the transmission is still bi-directional (compare to FIG. 9G). Mode splitting due to coupling is resolved because gain compensates loss leading to narrower line widths. FIG. 9D includes a trace 906 illustrating that in the broken-symmetry region input in the forward direction does not reach the output (compare to FIG. 9H).

Figure 9E:
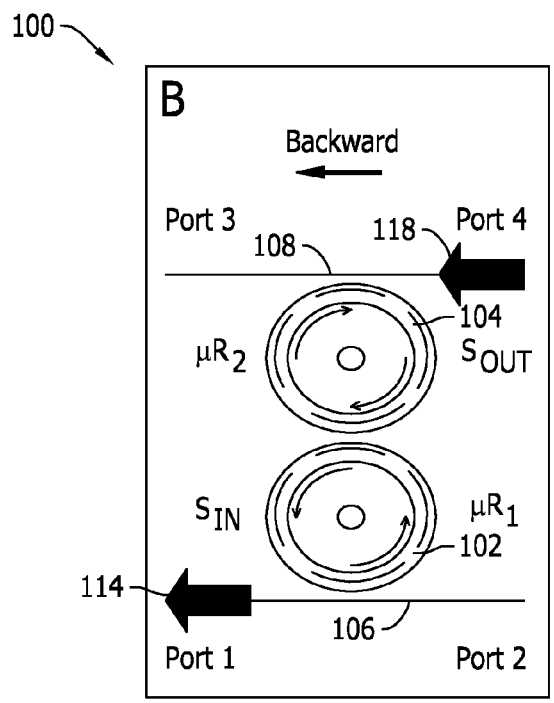
FIG. 9E is a schematic block diagram of the optical system shown in FIG. 1 with transmission in the reverse direction from the output port shown in FIG. 1 to the first port shown in FIG. 1.
Figure 9F:
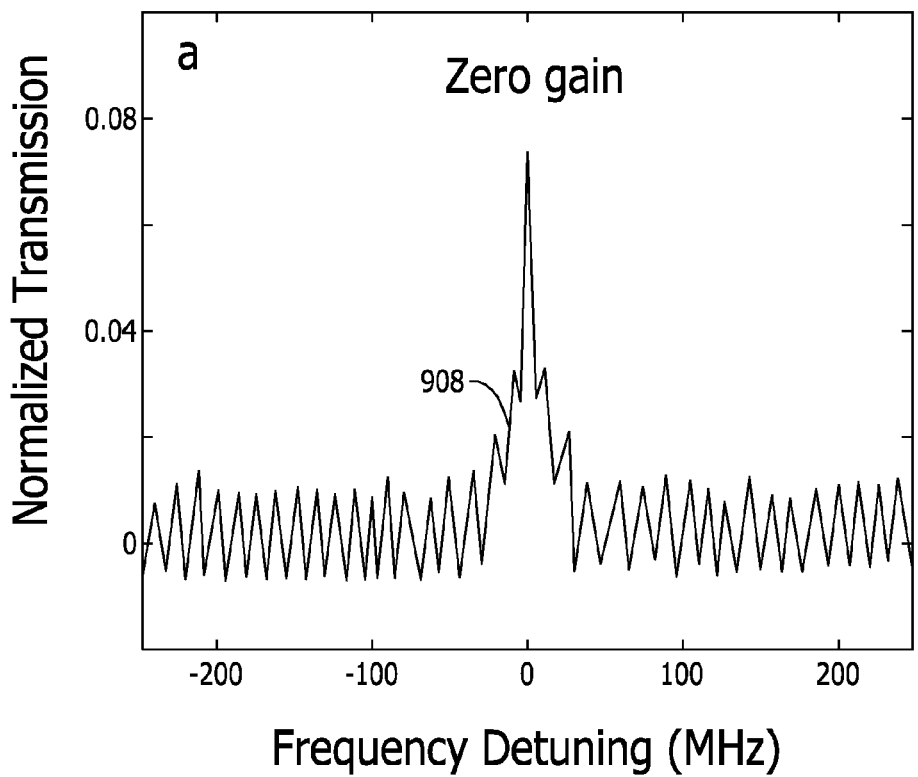
FIG. 9F illustrates that, in the backward direction as illustrated in FIG. 9E, light can pass through the system, when both resonators are passive (no gain).
Figure 9G:
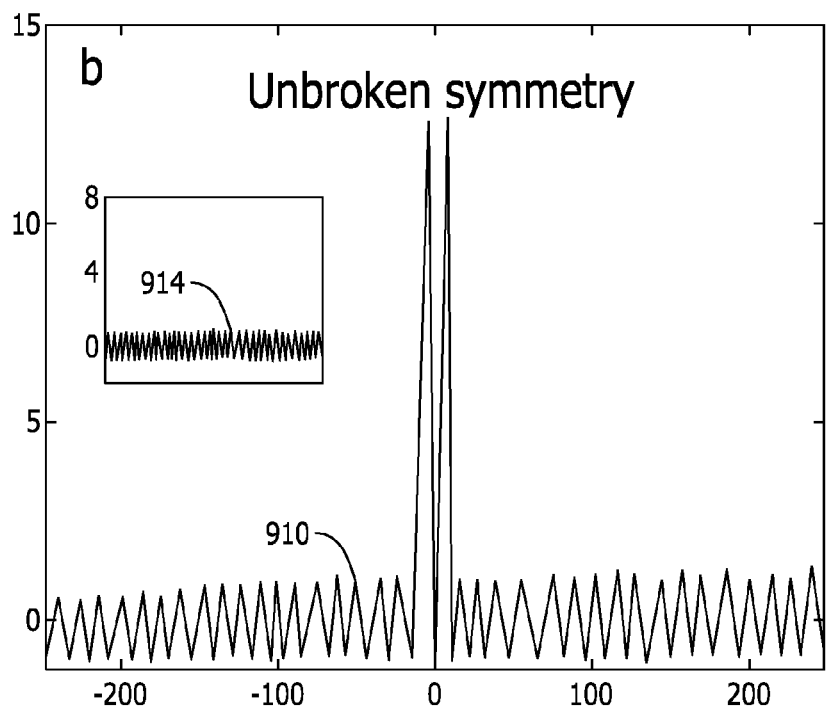
FIG. 9G illustrates that, in the backward direction as illustrated in FIG. 9E, light can pass through the system in the nonlinear regime, when the PT-symmetric resonators operate in the unbroken-symmetry region.
Figure 9H:
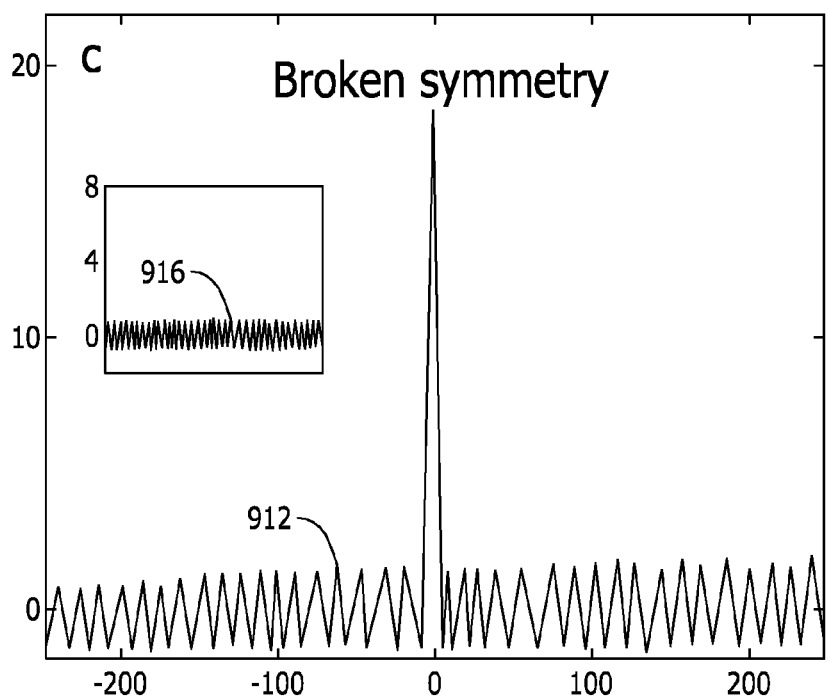
FIG. 9H illustrates that, in the backward direction as illustrated in FIG. 9E, light can pass through the system in the nonlinear regime, when the PT-symmetric resonators operate in broken-symmetry region.

FIG. 9E is a schematic block diagram of optical system 100 with transmission in the reverse direction from port 118 to port 114. FIGS. 9F-H illustrate observed unidirectional transmission for PT-symmetric WGM microresonators in the nonlinear regime. FIG. 9F includes a trace 908 illustrating when both resonators are passive (no gain), the transmission is bi-directional (reciprocal), and light is transmitted in the reverse direction. FIG. 9G includes a trace 910 illustrating a transmission in the unbroken-symmetry region, where the coupling exceeds the critical value and gain and loss are balanced and the transmission is still bi-directional. Mode splitting due to coupling is resolved because gain compensates loss leading to narrower line widths. FIG. 9H includes a trace 912 illustrating that the broken-symmetry region transmission becomes unidirectional (non-reciprocal). Input in the reverse direction does reach the output.

This resembles the action of a diode and implies that an all-optical on-chip diode with PT-symmetric WGM microcavities operates in the broken-symmetry region. An inset 914 in FIG. 9G and an inset 916 in FIG. 9H shows the signal at port 114 when there is no input signal at port 118.

In summary, using the methods described herein and illustrated in FIGS. 9A-H is an observed bidirectional transmission for passive photonic molecules (i.e. coupled resonators without gain), bidirectional light transmission in the unbroken symmetry region for PT-symmetric resonators, and unidirectional light transmission in the nonlinear and PT symmetry broken region.

FIGS. 10-14 represent various configurations of optical systems that include components configured to receive energy waves and to manipulate the energy waves to, for example, but not limited to generate logic outputs. In one embodiment, an optical diode is configured. In various embodiments, other forms of logic circuits are formed using sound wave devices to generate sound-based logic circuits or heat waves to generate heat-based logic circuits. The various configurations are formed using, for example, resonance chambers and controlling the coupling between the resonance chambers and the gain added to the system.

Figure 10:
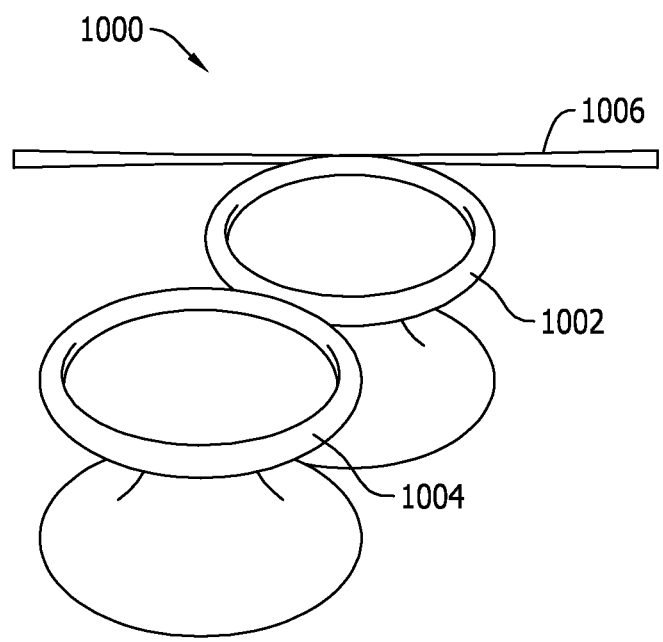
FIG. 10 is a perspective view of an optical system in accordance with another example embodiment of the present disclosure.

FIG. 10 is a perspective view of an optical system 1000 in accordance with another example embodiment of the present disclosure. Optical system 1000 includes a first whispering-gallery-mode (WGM) resonator 1002 closely directly coupled to a second WGM resonator 1004, and a waveguide 1006. First resonator 1002 operates as an active resonator and second resonator 1004 operates as a passive resonator.

Figure 11:
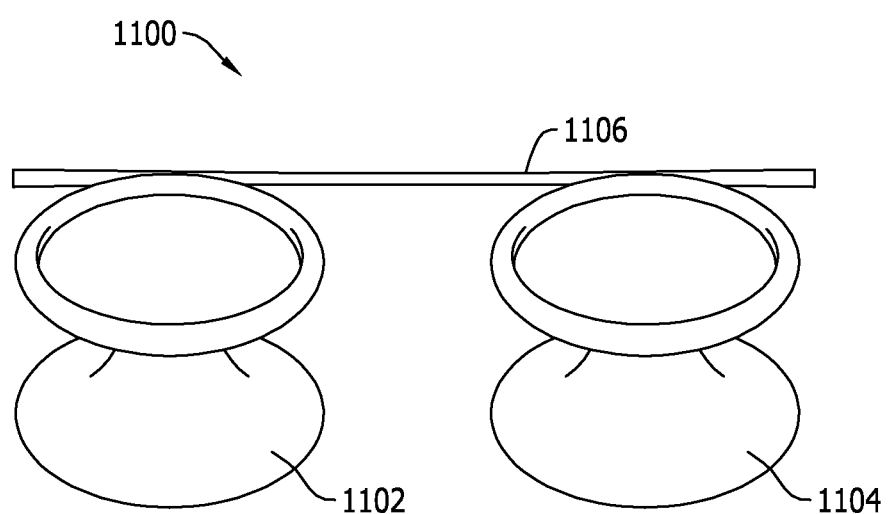
FIG. 11 is a perspective view of an optical system in accordance with another example embodiment of the present disclosure.

FIG. 11 is a perspective view of an optical system 1100 in accordance with another example embodiment of the present disclosure. Optical system 1100 includes a first whispering-gallery-mode (WGM) resonator 1102 closely directly coupled to a second WGM resonator 1104, and a waveguide 1106. First resonator 1102 operates as an active resonator and second resonator 1104 operates as a passive resonator.

Figure 12:
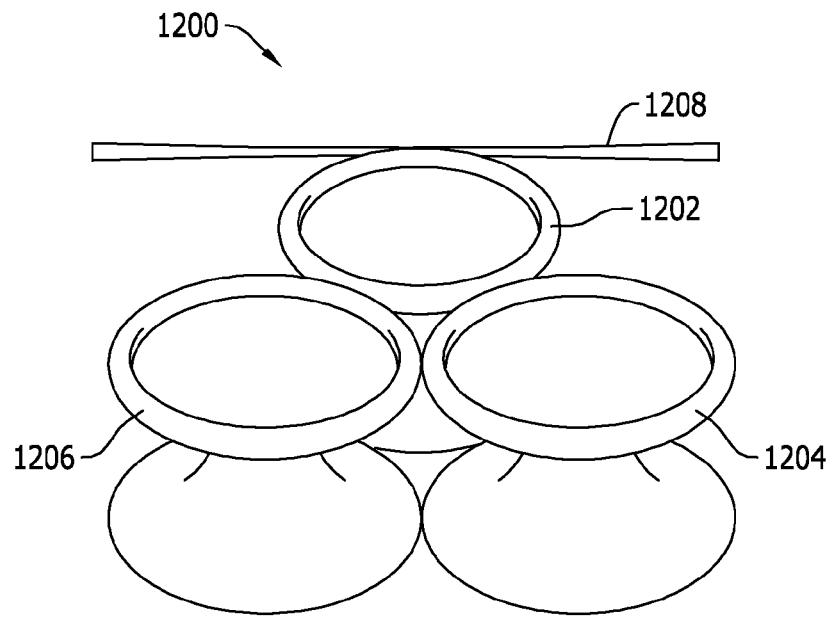
FIG. 12 is a perspective view of an optical system in accordance with another example embodiment of the present disclosure.

FIG. 12 is a perspective view of an optical system 1200 in accordance with another example embodiment of the present disclosure. Optical system 1200 includes a first whispering-gallery-mode (WGM) resonator 1202 closely directly coupled to a second WGM resonator 1204 and a third WGM resonator 1206, and a waveguide 1208.

Figure 13:
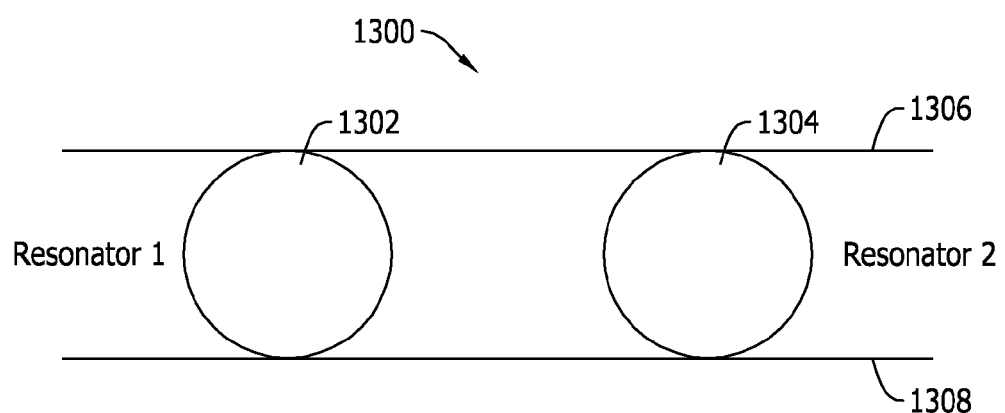
FIG. 13 is a schematic block diagram of an optical system in accordance with another example embodiment of the present disclosure.

FIG. 13 is a schematic block diagram of an optical system 1300 in accordance with another example embodiment of the present disclosure. Optical system 1300 includes a first whispering-gallery-mode (WGM) resonator 1302 loosely coupled to a second WGM resonator 1304, a first waveguide 1306, and a second waveguide 1308.

Figure 14:
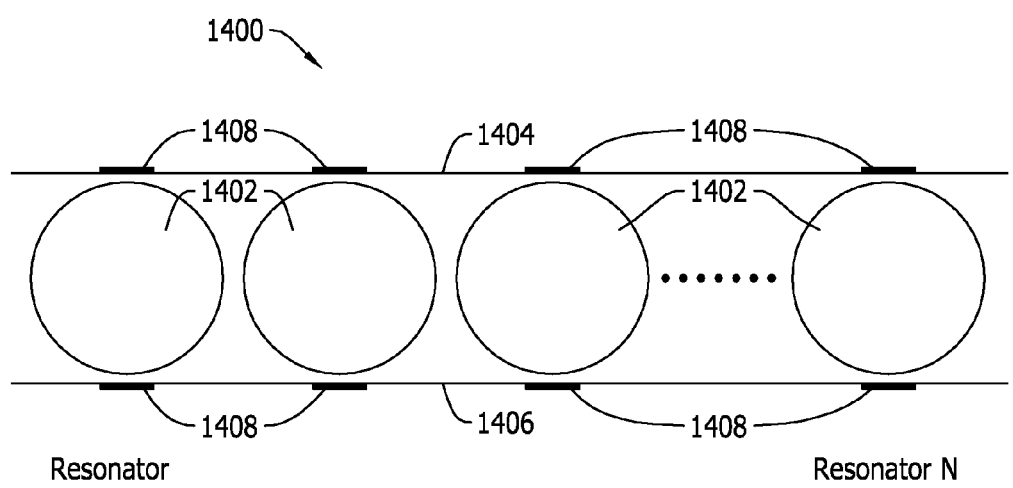
FIG. 14 is a schematic block diagram of an optical system in accordance with another example embodiment of the present disclosure.

FIG. 14 is a schematic block diagram of an optical system 1400 in accordance with another example embodiment of the present disclosure. Optical system 1400 includes a plurality of whispering-gallery-mode (WGM) resonators 1402. WGM resonators 1402 may be loosely coupled to adjacent WGM resonators 1402. Optical system 1400 includes a first waveguide 1404 and a second waveguide 1406.

Each of first waveguide 1404 and second waveguide 1406 includes a tapered portion 1408 proximate each of WGM resonators 1402 for coupling tapered portion 1408 to a respective WGM resonator 1402. Light received by WGM resonators 1402 from a respective waveguide 1404 or waveguide 1406 is confined within microtoroidal WGM resonators 1402. For example, light may circulate through microtoroidal WGM resonator 1402 many times before being completely dissipated. Light coupled out of microtoroidal WGM resonator 1402 is received by tapered portion 1408 and carried away from system 1400 through one of first waveguide 1404 and a second waveguide 1406.

The foregoing detailed description illustrates embodiments of the disclosure by way of example and not by way of limitation. It is contemplated that the disclosure has general application to the review and revision of advertisements. It is further contemplated that the methods and systems described herein may be incorporated into existing online advertising planning systems, in addition to being maintained as a separate stand-alone application.

While the disclosure has been described in terms of various specific embodiments, it will be recognized that the disclosure can be practiced with modification within the spirit and scope of the claims.

The above-described embodiments of a method and system of nonreciprocal light transmission in a chip scale system provides a cost-effective and reliable means for construction of optic analogs to electronic components. More specifically, the methods and systems described herein facilitate forming an optical assembly.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An optical assembly comprising;
a first dissipative optical system;
a second optical system coupled in an energy transfer communication with said first optical system, said second optical system configured to receive a flow of energy from an external source, said second optical system configured to transfer at least a portion of the received flow of energy to said first optical system through the energy transfer communication wherein the received flow of energy of said second optical system is approximately equal to a dissipated energy of the first optical system;
said first dissipative optical system and said second optical system are configured to operate below or above a transitional coupling strength thereby configured to effect phase transition from operating in a linear unbroken parity-time symmetry operation to a broken parity-time symmetry operation thereby inducing a non-reciprocal energy transmission, where
the at least a portion of the received flow of energy transferred to said first optical system from said second optical system is selectable using at least one of an amount of couple between said first optical system and said second optical system and a gain of said second optical system.

2. The optical assembly of claim 1, wherein said first optical system and said second optical system each comprise micro-resonator systems.

3. The optical assembly of claim 1, further comprising:
a first wave guide coupled in light communication to said first optical system; and
a second wave guide coupled in light communication to said second.

4. The optical assembly of claim 1, wherein said first optical system and said second optical system exhibit non-reciprocal light transmission based on optical nonlinearity when operating in a broken parity-time symmetry regime based on at least one of the amount of couple and the gain.

5. The optical assembly of claim 1, wherein said first optical system and said second optical system are configured to operate in parity-time symmetry when the gain of said second optical system is approximately equal to the loss in the first optical system, and where the coupling in the energy transfer communication is above a critical value.

6. The optical assembly of claim 1, wherein said first optical system and said second optical system are configured to operate in a broken parity-time symmetric phase when at least one of an amount of couple between the first optical system exceeds a predetermined threshold range and a gain applied to said second optical system exceeds a predetermined threshold amount.

7. The optical assembly of claim 6, wherein the amount of couple between the first optical system is selectable based on a physical distance between said first optical system and said second optical system and a position of a coupling medium associated with said first optical system and said second optical system.

8. The optical assembly of claim 6, wherein said second optical system further comprises a pump laser configured to pump predetermined ions into said second optical system, an amount of gain added by the pumped ions based on a wavelength of photons emitted by the pumped ions.

9. The optical assembly of claim 8, wherein the pumped ions comprise at least one of rare earth ions, fluorescent dyes, optical dyes, quantum dots, an optically active medium embedded into a resonator structure of said second optical system, Raman gain, and parametric gain from a material said second optical system is formed of.

10. The optical assembly of claim 6, wherein said gain is electrically pumped.

11. The optical assembly of claim 1, further comprising more than two optical systems, at least some of the more than two optical systems coupled together in energy transfer communication wherein a portion of the more than two optical systems are dissipative systems and are coupled to others of the more than two optical systems that are at least one of optically and electrically pumped to add a predetermined gain to the others of the more than two optical systems.

12. The optical assembly of claim 1, wherein a structure of at least one of said first optical system and said second optical system comprises at least one of a micro-scale resonator and nano-scale resonator, including one or more of a photonic crystal resonator, a Fabry-Pérot resonator, micro-bottle, a micro-toroid, a micro-disk, a micro-ring, a micro-sphere.

13. A method of nonreciprocal light transmission in a micro resonator system, said method comprising:
coupling a first micro resonator optical system in energy communication to a second micro resonator optical system;
operating the second micro resonator optical system in a dissipative mode wherein the second micro resonator optical system loses energy during the operation;
adding gain to the first micro resonator optical system;
transferring energy from the first micro resonator optical system to the second micro resonator optical system through the couple where the couple is sufficiently strong whereby the gain of the first micro-resonator and the losses of the second micro resonator are approximately equal and the first micro resonator and the second micro resonator form an unbroken linear PT-symmetric reciprocal micro resonator system;
transitioning the unbroken linear PT-symmetric reciprocal micro resonator system to a broken non-linear PT-symmetric non-reciprocal micro resonator system; and
operating the first micro resonator optical system and second micro resonator optical system in a broken parity-time symmetry regime based on at least one of the amount of couple and the amount of gain added such that the micro resonator system exhibits nonreciprocal light transmission.

14. The method of claim 13, wherein coupling a first micro resonator optical system in energy communication to a second micro resonator optical system comprises controlling a strength of the coupling using a distance between the first micro resonator optical system and the second micro resonator optical system.

15. The method of claim 13, wherein controlling a strength of the coupling comprises controlling a strength of the coupling between the first micro resonator optical system and the second micro resonator optical system such that energy in the first micro resonator optical system flows at a rate that compensates for the losses in the second micro resonator optical system.

16. The method of claim 13, wherein adding gain to the first micro resonator optical system comprises pumping predetermined ions into the first micro resonator optical system wherein an amount of gain added by the pumped ions is a function of a wavelength of photons emitted by the pumped ions.

17. The method of claim 13, wherein the first micro resonator optical system comprises an active resonator formed of silica doped with erbium 3+ ions ($Er^{3+}$), the second micro resonator optical system comprises a passive resonator formed of silica without dopants, the method comprises optically pumping the first micro resonator optical system with $Er^{3+}$ ions to add gain.

18. The method of claim 13, wherein adding gain to the first micro resonator optical system comprises optically pumping at least one of rare earth ions, fluorescent dyes, optical dyes, and quantum dots into the first micro resonator optical system.

19. The method of claim 13, wherein adding gain to the first micro resonator optical system comprises using at least one of an optically active medium embedded into a resonator structure of the first micro resonator optical system, Raman gain, and parametric gain from a material the first micro resonator optical system is formed of.

20. The method of claim 13, wherein operating the first micro resonator optical system and second micro resonator optical system in a broken parity-time symmetry regime comprises decreasing a coupling between the first micro resonator optical system and second micro resonator optical system to achieve a non-linear relationship between an input power and a light transmission through the first micro resonator optical system and second micro resonator optical system is non-linear.

21. An optical logic component comprising;
more than two resonant optical systems, at least some of the more than two resonant optical systems coupled together in energy transfer communication, a first portion of the more than two optical systems being dissipative systems, a second portion of the more than two optical systems are at least one of optically and electrically pumped to add a predetermined gain to associated ones of the first portion of the more than two resonant optical systems, said second portion configured to transfer energy to said first portion through the wherein the energy transferred to said first portion from said second portion is selectable to control a mode of operation of said optical logical component, where
the energy transferred to said first portion from said second portion is selectable using at least one of an amount of couple between said first portion and said second portion and a gain of said second portion.

* * * * *

UNITED STATES PATENT AND TRADEMARK OFFICE
CERTIFICATE OF CORRECTION

PATENT NO. : 9,531,150 B2
APPLICATION NO. : 14/685335
DATED : December 27, 2016
INVENTOR(S) : Sahin Kaya Ozdemir et al.

Page 1 of 1

It is certified that error appears in the above-identified patent and that said Letters Patent is hereby corrected as shown below:

In the Specification

Column 1, Lines 15-17, delete "The U.S. Government has certain rights in this application as provided for by the terms of Army Research Office grant No. W911NF-12-1-0026." and insert therefor -- This invention was made with government support under W911NF-12-1-0026 awarded by the Army Research Office (ARMY/ARO). The government has certain rights in the invention. --.

Signed and Sealed this
Seventh Day of April, 2020

Andrei Iancu
*Director of the United States Patent and Trademark Office*